(No Model.)
R. M. KEATING.
BICYCLE FRAME.
No. 559,178. Patented Apr. 28, 1896.
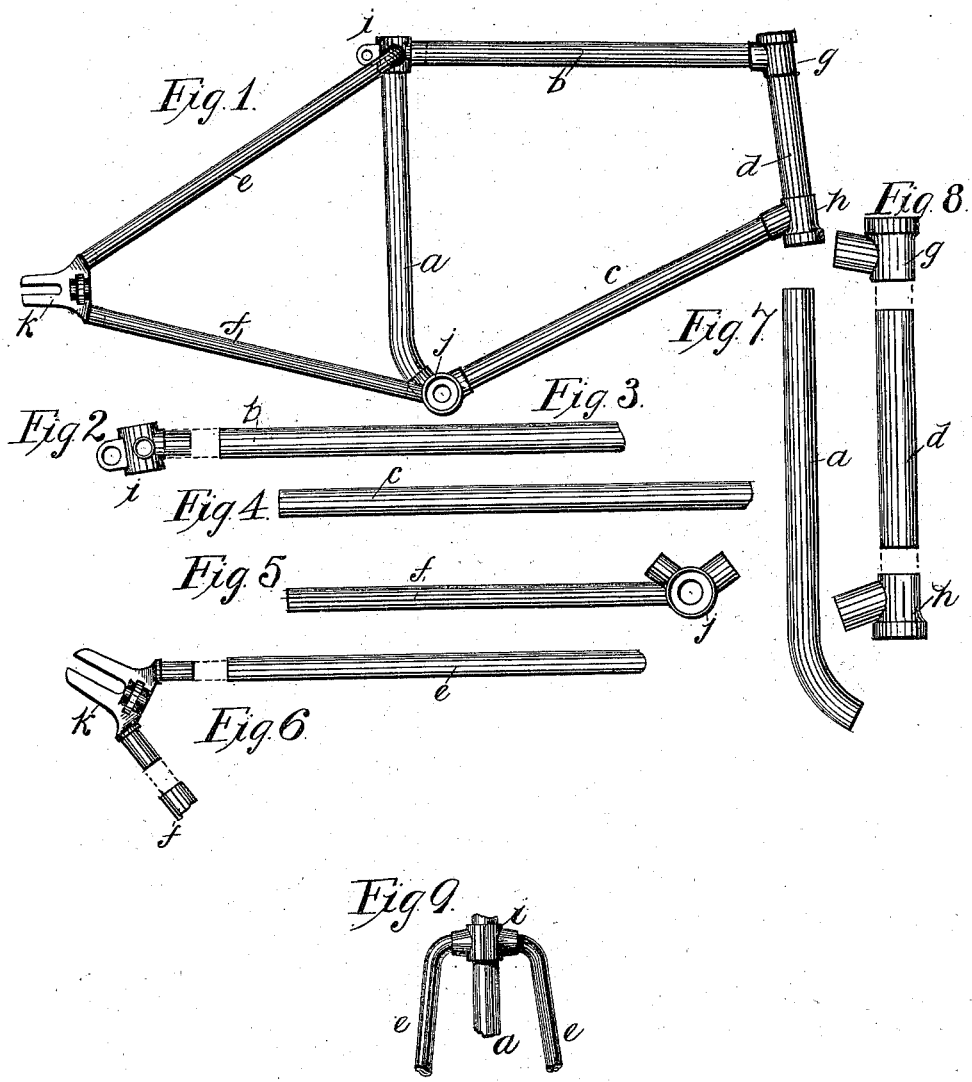
Witnesses
Fred A Bearse
E. C. Stickney.
Inventor
Robert M. Keating.
By Allen Webster
Attorney

UNITED STATES PATENT OFFICE.

ROBERT M. KEATING, OF SPRINGFIELD, MASSACHUSETTS.

BICYCLE-FRAME.

SPECIFICATION forming part of Letters Patent No. 559,178, dated April 28, 1896.

Application filed November 16, 1894. Serial No. 529,068. (No model.)

*To all whom it may concern:*

Be it known that I, ROBERT M. KEATING, a citizen of the United States of America, residing in Springfield, county of Hampden, and State of Massachusetts, have invented new and useful Improvements in Bicycle-Frames, of which the following is a specification, reference being had to the accompanying drawings and letters of reference marked thereon.

The objects of my invention are to provide a bicycle-frame which may be easily and inexpensively constructed and which shall have great rigidity and strength, and I accomplish the objects of my invention by the construction herein set out.

In the accompanying drawings, in which like letters of reference indicate like parts, Figure 1 is a side view of my improved form of construction. Fig. 2 is a side view of the saddle-post bracket. Fig. 3 is a view of the front top bar detached. Fig. 4 is a view of the lower front bar detached. Fig. 5 is a view of the crank-axle bracket and lower rear bar. Fig. 6 is a view of a rear bracket and the top rear bar. Fig. 7 is a view of the center bar. Fig. 8 is a view of the head, and Fig. 9 is a view of the saddle-post bracket and sections of the front top bar and rear top bar connected therewith.

In detail, $a$ indicates the center bar; $b$, the front top bar; $c$, the front lower bar; $d$, the head; $e$, the rear top bar; $f$, the rear lower bar; $g$, the head top bracket; $h$, the head lower bracket; $i$, the saddle-post bracket; $j$, the crank-axle bracket, and $k$ wheel-brackets.

The construction will be readily understood on reference to the drawings, wherein I have shown a side view of the center post while in position and with the parts connected together, and views also of the several parts detached.

The head-brackets are provided with recesses of a size to just receive the bars to which they are attached, and after being placed in position the same are brazed or otherwise secured in place. The saddle-post bracket is provided with like recesses, two of such openings being formed in lugs which project at the sides, into which the inturned ends of the top rear bars are secured.

The crank-axle bracket is provided with recessed lugs, in which the front and rear bars are secured, and provided also with a recessed lug projecting at an angle upwardly and rearwardly, into which the bent end of the vertical or central bar $a$ passes and is secured.

The great advantage of the curved vertical bar $a$ is found in the fact that while it may stand more nearly vertical the crank-axle bracket may be arranged nearer the front of the bicycle, and the seat may therefore be carried farther in the same direction, thus enabling the weight to be borne more equally by both wheels, while heretofore the weight has principally been borne by the rear wheel, and as the strain upon the frame is in a large degree caused by the pressure of the foot upon the pedal the tendency is to twist the frame at its lower central portion and thus throw the sprocket-wheels out of alinement, thus interfering with the free movement of the sprocket-wheels, as well as subjecting the frame to a dangerous strain. This tendency is largely overcome by reason of the curved lower portion of the vertical bar $a$, and it will readily be seen that the curved portion will resist a greater amount of strain than if the bar were straight and the tendency were simply to twist or turn the bracket on the bar, so that by such construction I am enabled to maintain the sprocket-wheels in perfect alinement and avoid the injurious springing or twisting of the frame at the crank-bearing portion.

In order that the advantage of my improved construction may be fully apprehended, it must be recollected that the propulsion of the machine in racing or in rapid riding is effected not by continuous downward pressure on the pedal during the whole of its descent, but by a succession of single impulses or thrusts directed thereupon when the pedal has just passed the apex of its rotation and has commenced its downward movement. The whole force of the stroke is concentrated into these momentary thrusts, and it is at this time that by far the greatest strain comes upon the crank-axle bracket, tending to turn it about the center bar. Now it is to be remembered that the object of my invention is to connect the front and rear lower bars and the center bar by a single bracket, having recessed lugs, as described, and at the same time to avoid the twisting or revolution of the bracket upon the end of the bar as an axis. Of course this twisting may be resisted by giving sufficient strength to the front and rear lower bars; but my invention has for its object to avoid this twisting without throwing any undue strain on these bars, so that they can be made exceedingly light. Now my invention consists in arranging the end of the center bar, where it enters the recess in the crank-axle bracket, in such a direction as to be parallel or substantially parallel to the line of thrust or impulsive force, which in rapid riding is given in discontinuous downward kicks, and which, as I have before stated, is directed upon the pedal while it is traveling from about thirty degrees to ninety degrees past the vertical, the force being probably greatest at between thirty degrees and forty-five degrees from the vertical.

In brief, the object of my invention has been to form the lower entering end of the center bar in a direction parallel with the line of maximum force applied, which, as is well known, slopes considerably from the vertical. With such construction the tendency for the maximum force to twist the bracket around the center bar as an axis is avoided.

The arrangement of the top rear bars $e$ in their connection with the saddle-post bracket is such that the whole strength of the material is utilized, as the inturned ends formed with a short bend will resist great strain in all directions.

Having therefore described my invention, what I claim, and desire to secure by Letters Patent, is—

In a bicycle-frame of a diamond type, the combination of the crank-axle bracket having a transverse bearing for the crank-axle and an upwardly and rearwardly extending recessed lug, and the center bar having its lower portion curved to terminate in a forwardly-projecting end entering said recessed lug, substantially as described.

ROBERT M. KEATING.

Witnesses:
ALLEN WEBSTER,
J. H. WILLIAMS.